United States Patent
Van Lerberghe

[19]

[11] Patent Number: 6,004,694
[45] Date of Patent: Dec. 21, 1999

[54] FLAT ACCUMULATOR DEVICE HAVING AN ELECTROCHEMICAL CELL AND ELECTRICAL CONTACTS

[75] Inventor: Steven Van Lerberghe, Le Mans, France

[73] Assignee: U.S. Philips Corporation, New York, N.Y.

[21] Appl. No.: 09/024,635

[22] Filed: Feb. 17, 1998

[30] Foreign Application Priority Data

Feb. 18, 1997 [FR] France .................................. 97 01883

[51] Int. Cl.[6] .............................. H01M 2/02; H01M 6/12; H01M 2/00; H01M 2/12
[52] U.S. Cl. ............................ 429/179; 429/127; 429/53; 429/54; 429/56; 429/61; 429/163; 429/162; 429/178
[58] Field of Search ................................ 429/127, 53, 54, 429/56, 61, 163, 178, 162, 179

[56] References Cited

U.S. PATENT DOCUMENTS

| 4,256,812 | 3/1981 | Tamura et al. .............................. 429/56 |
| 5,405,715 | 4/1995 | Dawson et al. ............................. 429/54 |
| 5,431,701 | 7/1995 | Kagawa et al. .......................... 29/623.2 |
| 5,637,418 | 6/1997 | Brown et al. ............................. 429/127 |
| 5,821,008 | 10/1998 | Harada et al. ............................. 429/56 |
| 5,853,912 | 12/1998 | Naing et al. ............................... 429/61 |

FOREIGN PATENT DOCUMENTS

| 62-216151 | 9/1987 | Japan . |
| WO9410712 | 5/1994 | WIPO . |

*Primary Examiner*—Maria Nuzzolillo
*Assistant Examiner*—Tracy Dove
*Attorney, Agent, or Firm*—Dicran Halajian

[57] ABSTRACT

A flat accumulator device (10) includes a planar electrochemical cell with at least two planar electrodes (2, 2') having opposite polarities disposed on either one of the two sides of an electrolyte material (3, 4), a planar housing having planar parts (1, 1') and enveloping the planar electrochemical cell, and electrical contacts (30, 30') of the electrodes forming external electric terminals fixed in a moisture-proof manner to the planar parts of the housing. In this device, the flat accumulator includes a security portion (31, 32; 31', 32') which forms a circuit breaker that can be triggered by a short-circuit produced between the electric terminals of the housing.

5 Claims, 2 Drawing Sheets

FLAT ACCUMULATOR DEVICE HAVING AN ELECTROCHEMICAL CELL AND ELECTRICAL CONTACTS

BACKGROUND OF THE INVENTION

The invention relates to a flat accumulator device including a planar electrochemical cell with at least two planar electrodes having opposite polarities disposed on either one of the two sides of an electrolyte material, a planar housing having planar parts and enveloping said planar electrochemical cell, and electrical contact means of the electrodes forming external electric terminals fixed in a moisture-proof manner to the planar parts of the housing.

The invention finds its application in the manufacturing of electric batteries or for rechargeable batteries applied to portable apparatus such as telephone terminals.

A device of the flat and thin accumulator type having an electrochemical cell, a housing and contact means forming external terminals is already known from Japanese patent JP-62-216151 (Matsushita Electric Ind. Co. Ltd. Minoru Yoshinaka). The known housing comprises two plane walls i.e. a lower wall and an upper wall made of a non-conductive material (polycarbonate resin) separated by a plastic body enveloping an electrochemical cell. This electrochemical cell comprises lead electrodes applied against the plane lower and upper walls of the housing. A security valve, disposed through the body of the housing permits of diminishing an occasional internal overpressure of this electrochemical lead cell. The plane upper and lower walls comprise each a current collector in the form of a flat copper plug, passing through said wall to ensure an electrical contact between the electrodes and the exterior of the housing. One point is that the impermeability of these plugs is realized by heating and melting the plane walls, the plugs and the electrodes together to ensure a cohesion of these parts. Another point is that the electrodes are, in addition, made integral with the body of the housing by heating. The plugs are used as positive and negative external contacts of the housing. These plugs have no protrusions so that the housing of the accumulator is thin and flat.

A technical problem is linked with the electrochemical cells called rechargeable chemical batteries. To ensure their operation, certain batteries such as the lead-acid batteries are from the start under a pressure that exceeds the atmospheric pressure. In the case of such batteries, an occasional overpressure may occur during the recharging operation. Other rechargeable chemical batteries, although they do not work in a state of overpressure, may none the less occasionally be subjected to a phenomenon of overpressure. Such a phenomenon may occur, for example, as a result of the fact that during the recharging operation a connection of the battery is defective. The defective connection may be the cause of a short-circuit which generates a rapid release of gas due to an unwanted chemical reaction between the various elements of the cell, and which results in an overpressure in the housing accompanied by a rapid rise of temperature. This reaction may then result in an explosion due to the overpressure, with a fusion of the materials due to the risen temperature.

In the known device, the problem of overpressure is taken into account and resolved by an air hole in the form of a pipe through the body of the housing. This air hole permits of the ejection of a small plug placed on the outer end of the pipe for diminishing the pressure inside the housing and avoiding the explosion of the device.

Another technical problem is that inside an electrochemical cell it is impossible to have an assembly of metallic parts of different metals, soldered or mating and enveloped in the electrolyte. This type of assembly is absolutely to be outside the chemical environment formed by the electrolyte.

In the known device, this problem is taken into consideration and solved by the fact that the lead electrodes are soldered on the whole internal surface of the plane walls of the housing and are soldered furthermore along their periphery between the body and the plane walls of the housing, so that the lead-copper soldering of these electrodes with the plugs which are used as external contacts is not enveloped in the electrolyte.

SUMMARY OF THE INVENTION

It is an object of the invention to provide a device of the type mentioned above whose security in the case of a defective connection or improper use is improved.

This object is achieved by means of a device of the type described in the opening paragraph, comprising a security arrangement which forms a circuit breaker which can be triggered by a short-circuit produced between the electric terminals of the housing.

An advantage of the device according to the invention is that it provides an additional security system compared with the known device, which has an effect on a frequent danger that has not been taken into account up to now, that is to say, the short-circuit.

In an embodiment of the device according to the invention, the housing comprises two parallel planar plates opposite each other and each lying close to one of the electrodes called a corresponding electrode, these plates being electrically insulated and these electrodes being interconnected in a moisture-proof manner, and each plate of the housing has an opening closed in a moisture-proof manner by a conductive part called pressure button which forms the current collector via a pressure contact with the corresponding electrode and forms one of said external electric terminals of the housing, said pressure button ensuring the function of circuit breaker by breaking the contact with the corresponding electrode when there is an overpressure in the moisture-proof housing due to a short-circuit which generates a chemical reaction in the electrochemical cell and a bulging of the housing with a deformation of the plates.

An advantage of the device according to the invention is that when there is a short-circuit between the electrical contacts of the device resulting in an overpressure in the housing, the pressure buttons which are not fixed to the corresponding electrodes are separated from said electrodes under the influence of the overpressure which bulges the faces opposite the housing and thus cuts off the circuit.

Another advantage of the device according to the invention is that if an overpressure occurs due to whatever cause, and if the overpressure is very large, then the faces opposite the housing are very much deformed leading to the fact that the pressure buttons are no longer integral with said faces and that an air hole is formed so that an explosion is avoided.

An advantage of the device according to the invention is that the pressure buttons, in addition to their first function of current collector, have a function of circuit breaker and a function of air hole. Thus, a tube passing through the housing body as known previously is avoided. The result of this is that the planar housing may be made thinner relative to the known housing. The latter advantage is particularly important nowadays, because the designer of batteries seeks to construct rechargeable accumulators which are ever thinner to be used in ever smaller mobile or portable devices. The ideal dimensions actually envisaged for an accumulator are those of a smart card.

In an embodiment of this device, each pressure button has a first part called internal part which is fixed in a moisture-proof manner to the plate of the corresponding housing, which is in electrical pressure contact with the corresponding electrode, which is not fixed to said corresponding electrode and which is made of a first conductive material without chemical reaction with the materials of said electrode and the electrolyte, and in which each pressure button has a second part called external part which does not have contact with the electrochemical cell, and is in electrical contact with the internal part of the pressure button and which is made of a second conductive material which is different and suitable for forming an external contact terminal of the accumulator.

Another advantage of the device is that a moisture-proof junction between the electrode metal and another metal may be realized in a very simple manner.

These and other aspects of the invention will be apparent from and elucidated with reference to the embodiments described hereinafter.

DESCRIPTION OF THE PREFERRED EMBODIMENTS

Figure 1A:
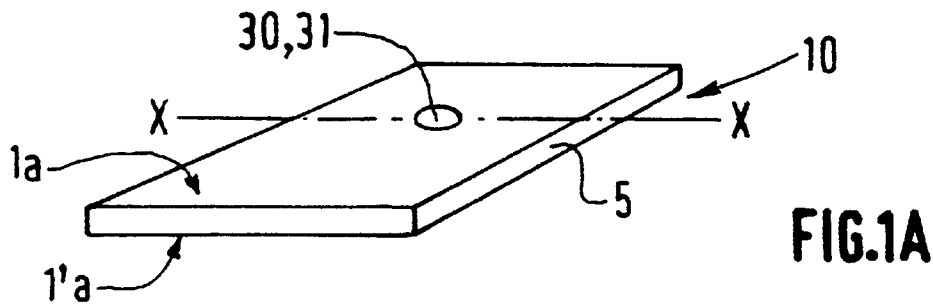
FIG. 1A represents a flat accumulator device in a perspective view.
Figure 1B:
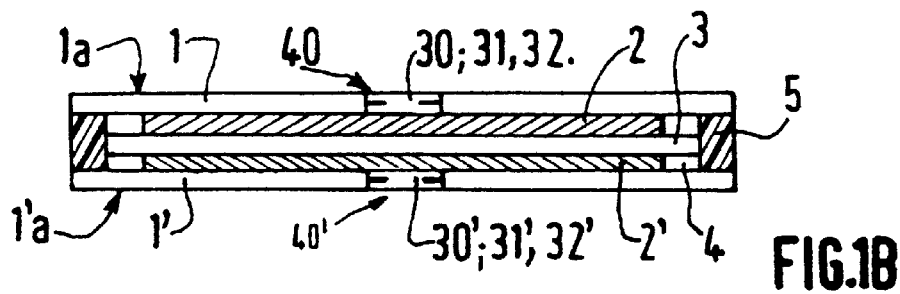
FIG. 1B represents in a cross-sectional view the flat accumulator device shown in FIG. 1A, FIGS. 2A, 2B represent in a cross-sectional view an opening in a plate of the housing of this flat accumulator for receiving an electric terminal.

FIG. 1A diagrammatically shows in a perspective view a device of the accumulator type 10. This accumulator 10 includes a planar electrochemical cell 2, 2' 3, 4 and a planar housing 1, 1', 5, 30, 30' enveloping said planar electrochemical cell. FIG. 1B represents this flat accumulator device in a simplified cross-sectional view along the axis of FIG. 1A.

The planar electrochemical cell comprises at least two electrodes having opposite polarities, denoted 2 and 2', a separator element 3, which extends to beyond the edges of the electrodes 2 and 2' to avoid internal short-circuits, and impregnated by an electrolyte 4. The electrochemical cell is preferably of a rechargeable type, for example, of the lead-acid type known to a person of ordinary skill in the art.

The housing comprises two planar plates 1 and 1' opposite each other, each in parallel with and close to the opposite-polarity electrodes 2, 2' of the electrochemical cell. These plates 1 and 1' are made of an insulating material or also of a conducting material which has an insulation coating. These plates are interconnected in a moisture-proof manner by a cord 5 of insulation sealing material, or also by a body 5 sealed along the periphery of each of the plates 1, 1'. An air hole of the type known from the state of the art is not useful.

The planar housing 1, 1', 5 may have any form and dimension. Up to the present day, housings have been preferred to have substantially the forms and dimensions of the smart cards, that is to say, rectangular and thin. None the less, the housing and the planar electrochemical cell it contains may have many other forms such as round or complex.

The flat accumulator includes electrical contact means 30 of the electrodes 2, 2', which form external electric terminals of opposite polarities available respectively, on each plate 1, 1' of the housing. For this purpose, each face has an opening 40, 40', respectively. Hereinbelow will be described the opening 40 in the plate 1. The opening 40' in the plate 1' is made symmetrically.

Figure 2A:
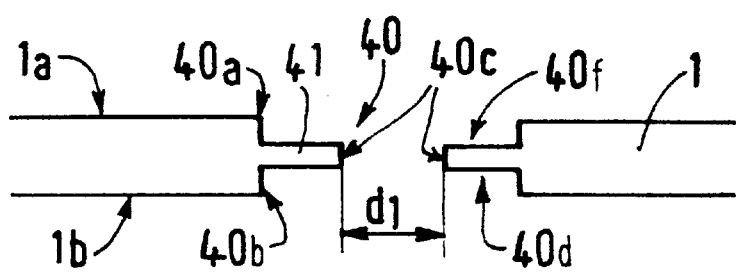

With reference to FIG. 2A, the opening 40 has a central opening 40c defined by a flange 41. The flange 41 is realized by making shoulders 40f, 40d from each face 1a, 1b of the plate 1. The shoulders determine peripheral openings 40a, 40b which are preferably, but not exclusively, the same.

Figure 2B:
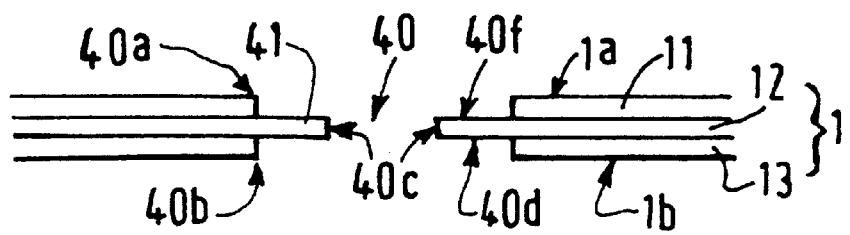

With reference to FIG. 2B, the material forming the plate 1 (or 1') is a multilayer material 11, 12 or 13. A layer 12 situated between the layers 11 and 13 extends beyond these layers towards the center of the opening 40 to form the flange 41. The intermediate layer 12 may be, for example, metallic, whereas the layers 11 and 13 are insulating layers, but also all the layers may be insulating.

The opening 40 is closed in a moisture-proof manner by the electrical contact means 30, also referred to as a conducting tube 30, which forms an electrical contact with the electrode 2 and forms an external contact terminal of the housing of the accumulator 10.

With reference to FIG. 3 and FIGS. 4A to 4C, the conducting tube 30 comprises two parts 31, 32. A first part 32 called internal part is in electric contact with the electrode 2 because, when in operation, an electrochemical cell is always under sufficient pressure to provide that the terminal electrodes such as 2 and 2' are flush-mounted between the plates 1, 1' of the housing. A second part 31 called external part forms the external electric terminal of the housing corresponding to the polarity of the electrode 2. The internal part 32 is made of a material in chemistry called compatible with the material of the electrode 2 with which this part 32 is in electric contact. Compatible is understood to mean any material that does not cause a chemical reaction when it is in contact or close to the electrode material and enveloped in the electrolyte material. For example, the internal part 32 is made of the same material as the electrode 2.

The external part 31 is preferably a conductive material which has little electrical resistance and is not very oxidizable, so that the function of current collector can be realized and a proper electrical contact can be formed. According to the invention, the internal and external parts 32, 31 are assembled to provide an electrical connection having a good quality between two different conductive materials and this without enveloping them in the electrolyte material.

Figure 3:
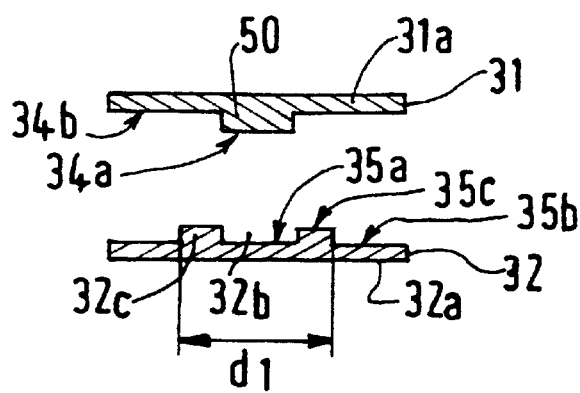
FIG. 3 represents in a cross-sectional view parts for forming such a terminal.
Figure 4A:
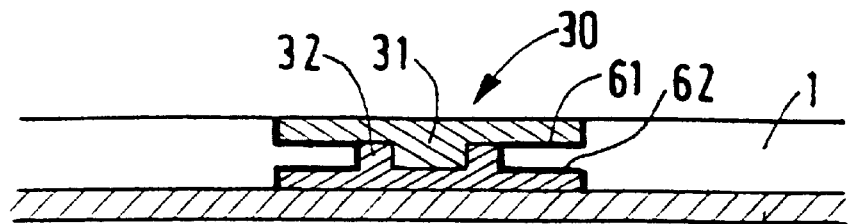
FIGS. 4A to 4C represent examples of installing electric terminals in openings.

With reference to FIGS. 3 and 4A, the conducting tube 30 will be called pressure button hereinafter. Each part 31 and 32 has a planar part 31a and 32a respectively, and faces 34b and 35b respectively, which rest on and by gluing or soldering or any other fixing means 61, 62 are fixed to the faces 40f, 40d of the flange 41. And at least one of the parts 31 or also 32 comprises a plug 50 for contacting the other part 32 or 31 respectively, through the opening 40c of the flange 41.

The plug 50 may establish the contact between the parts 31, 32 in various ways cited by way of example. With reference to the FIGS. 3 and 4A, the plug 50 is applied to the part 31. In this case, the part 32 comprises a shoulder 32c having the form and dimension of the inner opening 40c of the flange. The part 32 further includes a recess 32b intended for embedding the plug 50. By fixing the parts 31, 32 for obtaining the moisture-proof sealing of the opening 40 of the plate 1, the surface of the plug 50 is in contact with the surface 35a of the recess 32b and the surface 35a is in contact with the surface 34b. The plug 31b is blocked in the recess 32b and the parts 31 and 32 are fixed to the plate 1 on either one of the two parts 40f, 40d of the flange with fixing means (61, 62) already described.

As shown in FIG. 1B, a symmetrical mounting 30' is made for sealing the opening 40' of the plate 1' and realizing the same function as the pressure button 30.

Figure 4B:
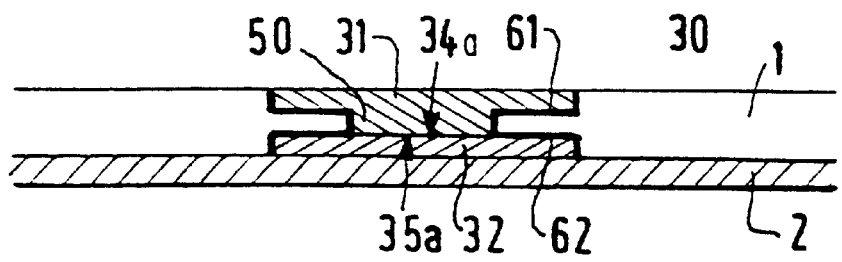

With reference to FIG. 4B, according to a simplified variant of the pressure button of FIG. 4A, the part 31 comprises a plug 50 which has a surface 34a for making contact with the surface 35a of the part 32 over the whole opening 40c of the flange 41. The parts 31, 32 are also fixed to the flange 41 by fixing means 61, 62 as already described.

Figure 4C:
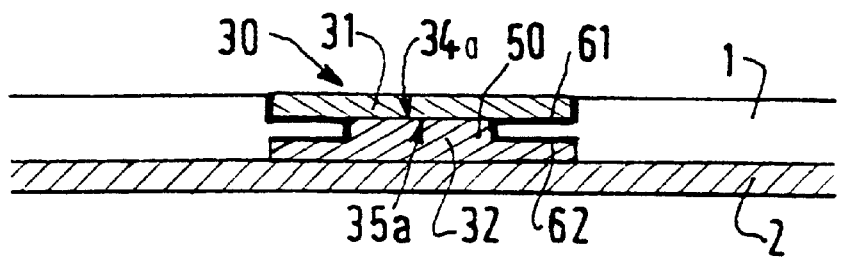

With reference to FIG. 4C, the particularities of the parts 31, 32 of FIG. 4B are reversed.

Figure 5A:
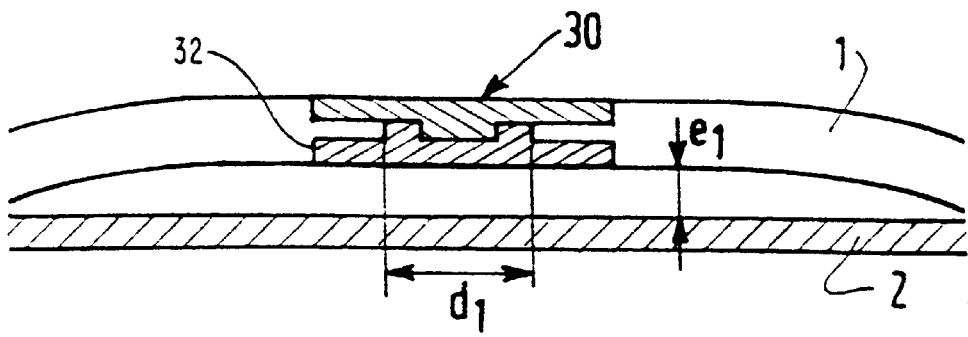
FIGS. 5A, 5B illustrate the functions of a terminal in the case of overpressure in the housing of the accumulator.

If, with reference to FIGS. 1B and 5A, where the polarities of the terminals 30, 30' are reversed as a result of a connection error during a charging or recharging operation of the accumulator element 10 this will result in a short-circuit which, as described in the introductive part, generates an unwanted chemical reaction and an overpressure will occur in the housing. In that case, the plates 1, 1', although substantially rigid, become curved towards the exterior of the housing: the housing becomes bulged. The plates 1 and 1' and the pressure buttons plugs 30, 30' then become separated from the electrodes 2, 2' over a small distance e1 which is sufficient to realize the function of circuit breaker. This is possible because of the fact that the electrodes 2, 2' are neither fixed to the plates 1, 1', nor to the parts 32, 32' of the pressure buttons 30, 30'.

Figure 5B:
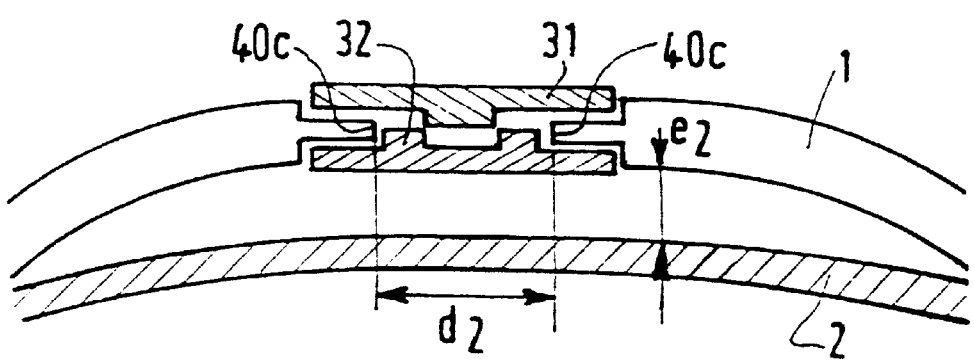

With reference to FIG. 5B, if the overpressure suddenly becomes very large, for example, larger than in the case illustrated with reference to FIG. 5A, the plates 1, 1' become still more bulged and the distance e2 which separates the plates 1, 1' from the electrodes 2, 2' becomes larger than the small distance e1 (FIG. 5A). Not only the electrodes 2, 2' are disconnected from the current collector plugs 30, 30', but, in addition, the dimension of the opening 40c of the flange which is normally d1 is enlarged depending on d2>d1. In that case, the fixing means 61, 62 (FIGS. 4A–4C) of the plug 30, 30' in the opening 40, 40' of the plates 1, 1' become weak points which result in that the parts 31, 32 of the plug 30 (or 30', respectively) separate from the plates 1, 1', creating an air hole which makes the pressure in the housing go down while avoiding an occasional explosion.

The plugs 30, 30' formed by the parts 31, 32 (and 31', 32', respectively) thus have the function of being:

current collectors of a material compatible with the electrodes of the electrode side, external contact terminals of the housing, of a low-oxidation and low resistance material, circuit breakers by simple disconnection of the electrodes, air holes by separation of the plates from the housing in the case of hazardous overpressure.

What is claimed is:

1. An accumulator comprising:

at least two electrodes;

an electrochemical cell having an electrolyte material disposed between said at least two electrodes;

a housing which surrounds said electrochemical cell;

electrical contacts which contact said at least two electrodes through said housing in a moisture-proof manner;

said electrical contacts breaking contact with said at least two electrodes in response to an overpressure in said housing, wherein one of said electrical contacts has an internal part which contact one of said at least two electrodes and an external part which contacts said internal part, said internal part having a recess which receives a plug of said external part.

2. The accumulator of claim 1, wherein said housing has openings to accommodate said electrical contacts and has flanges that protrude toward said openings; said flanges being sandwiched between planar sections of said internal parts and said external parts.

3. The accumulator of claim 1, wherein said housing is made of an insulating material.

4. The accumulator of claim 1, wherein said housing is made of a multi-layer plastic material.

5. The accumulator of claim 1, wherein said housing is made of a multi-layer material including insulating layers and a metallic layer formed between said insulating layers, said metallic layer forming flanges that protrude toward an opening of said housing that receives one of said electrical contacts, said flanges being sandwiched between planar sections of said internal parts and said external parts.

\* \* \* \* \*